United States Patent [19]

Stumpf

[11] 3,934,951

[45] Jan. 27, 1976

[54] SYSTEM OF CONSTRUCTION COMPONENTS FOR THE PRODUCTION OF ROLLER ASSEMBLIES

[76] Inventor: Karl Stumpf, Goethestrasse 1, 4 Dusseldorf, Germany

[22] Filed: Feb. 21, 1975

[21] Appl. No.: 551,830

[30] Foreign Application Priority Data
Mar. 30, 1974 Germany.................... 7411241[U]

[52] U.S. Cl..................................... 308/20; 193/37
[51] Int. Cl.².....................F16C 13/00; F16C 35/00; B65G 13/00
[58] Field of Search............ 308/149, 150, 18, 139, 308/20, 170, 122; 74/469; 193/37; 198/286

[56] References Cited
UNITED STATES PATENTS

| | | | |
|---|---|---|---|
| 1,829,189 | 10/1931 | Schroeder | 308/20 |
| 1,856,547 | 5/1932 | Gotthardt | 308/20 |
| 2,422,061 | 6/1947 | Yager | 308/169 |
| 2,766,076 | 10/1956 | Saxe | 308/20 |
| 2,914,811 | 12/1959 | Cole et al. | 308/20 |
| 3,270,577 | 9/1966 | Poundstone | 193/37 |

*Primary Examiner*—Lloyd L. King
*Attorney, Agent, or Firm*—Roylance, Abrams, Berdo & Kaul

[57] ABSTRACT

Components for roller assemblies including a cylindrical roller pipe, and first and second end members having internal roller bearings, the end members being slidable onto a fixed cylindrical axle and into the ends of the pipe. Hubs on the end members frictionally engage the inside of the pipe, and a flange abuts the end of the pipe. A plurality of hollow frustoconical members are slidable over the pipe in end-to-end relationship surrounding the pipe between the end members, the outer surfaces of the frustoconical members making equal angles with the axes thereof, the members being of graduated sizes so that the smaller end of one member has an outer surface diameter equal to the larger end of the next adjacent member to form a continuous frustoconical outer surface along the length of the assembly. An annular spacer is provided between the outside of one end of the pipe and the larger end of the largest one of the frustoconical members to maintain proper coaxial spacing of the larger end, the spacer member having a shoulder abutting the larger end of the largest member. One of the end members can have a pulley for driving the roller assembly.

3 Claims, 5 Drawing Figures

U.S. Patent   Jan. 27, 1976   3,934,951
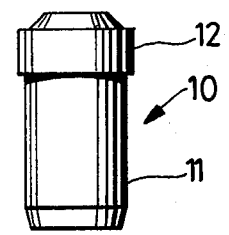
FIG. 1
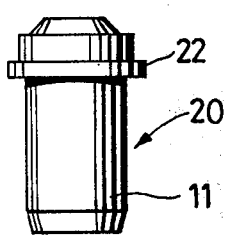
FIG. 2
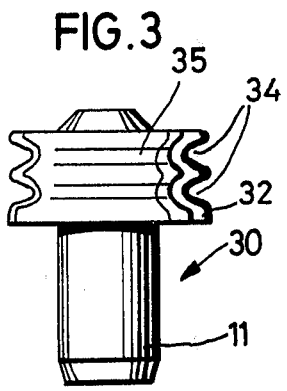
FIG. 3
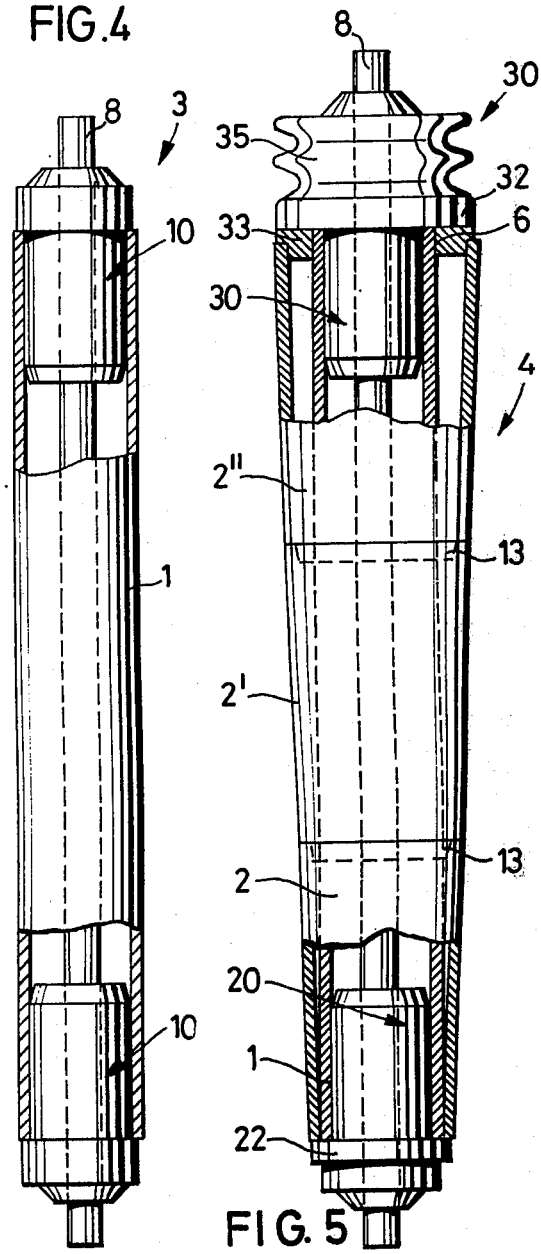
FIG. 4
FIG. 5

SYSTEM OF CONSTRUCTION COMPONENTS FOR THE PRODUCTION OF ROLLER ASSEMBLIES

This invention relates to a system of construction components from which roller assemblies for a roller train can be produced.

It is known to produce a cylindrical roller for a roller train in which bearing inserts are provided with journal bearings or bushings which revolve on a fixed shaft, as shown in Swiss Pat. No. 406,974. It is also known from German Patent application No. 2,006,880, which is open for public inspection, to provide conical rollers for roller trains in which individual frustoconical or potshaped conical elements follow one another. The conical elements located at the ends of the roller assembly are mounted on the fixed shaft by bearing inserts which contain ball bearings. In another embodiment of the same German application, the conical elements are disposed on a continuous roller pipe which is, in turn, mounted on the fixed shaft by ball bearing members.

In known conveyor installations cylindrical and conical rollers for roller trains are used side-by-side for straight sections of the roller train or curves thereof wherein, depending on the circumstances, the individual roller assembly can be active or passive, i.e., either driven or not driven by some motive force. The variety of the required roller assemblies in the roller train necessitates a corresponding multiplicity of various types of spare parts which must be maintained in storage in order to be sure of having the necessary components for maintenance and repair. This is especially true of the bearing inserts which, because of the required variety in shapes and the necessity of careful maintenance, causes a considerable expense in inventory of such spare parts, making the entire roller train a costly aspect of any facility.

It is an object of the present invention to provide a system of construction components or units which permit assembly of a variety of various roller assembly parts using a relatively small number of basic components which can be assembled in a variety of ways to solve the various problems encountered in the roller train, minimizing the number of components and the variety in components which must be maintained as replacement parts.

Briefly described, the system of components for the selective production of cylindrical and frustoconical, driven and non-driven rollers of the roller train comprises a roller pipe, frustoconical element which can be slidably mounted on the roller pipe, one adjacent another, the frustoconical elements together resulting in a continuous outer frustoconical surface of the roller assembly. The assembly is held together and mounted on a fixed axle by bearing inserts which are supplied in three basic types having substantially identical hub portions insertable into the roller pipe and collars suited to the specific assembly to be formed. One of the inserts is provided with a collar or flange having an outside diameter smaller than the outside diameter of the roller pipe. A second pipe is provided with a collar having an outer diameter slightly smaller than the outer diameter of the smaller end of the smallest frustoconical element. The third type of insert is provided with an integrally formed pulley wheel by which a driven roller assembly can be formed. Using the first of these types at both ends of the assembly results in a cylindrical roller assembly. The second type is employed in conjunction with an annular spacer member to appropriately space the larger end of the largest employed frustoconical components to form a passive roller of the frustoconical type, and the third kind of bearing element can be employed to form either a cylindrical or frustoconical driven roller.

It will be observed that roller assemblies, particularly conical roller assemblies, of various lengths can be formed using the apparatus of the present invention. With the set of exchangable bearing and driving elements disclosed herein, all of the necessary roller assemblies can be produced. Since only three types of bearing inserts need to be employed, they can be produced in large quantities at the correspondingly lower cost.

The driving wheel is preferably developed as a double-sheave belt or rope pulley in order to be able to couple together the preceding as well as the following rollers in a driving relationship.

As will be seen, conical rollers of various lengths are formed by pushing variable numbers of successively larger conical elements onto the roller pipe. The smallest conical element is always the same so that the bearing element at that end need not be varied. The conical elements at the larger end of the roller assembly can therefore having varying diameters depending upon the length of the roller. Whenever the conical elements on this end are closed, then the bearing insert, or spacer element, which is always dimensioned accordingly, abuts on the end surface of the roller assembly.

It will be recognized that rollers or roller trains have previously been known wherein conical elements are "pot-shaped" and open toward the larger side. In the prior constructions of this type it has been necessary to employ a special bearing element so that the abutting diameter thereof would necessarily need to be dimensioned to mate each possible "largest end" dimension for this last, largest conical element. In order to solve this problem, according to one embodiment of this invention, spacing pieces are provided for such conical element, which spacing pieces support the largest element pushed onto the roller pipe, the spacers then abutting against the smaller collar of the bearing insert. The spacing pieces therefore take over the function of closed terminal surfaces of the bearing elements so that the same bearing insert can be used, the only changable portion being a simple annular spacer device which is inexpensive.

In order that the manner in which the foregoing and other objects are attained in accordance with the invention can be understood in detail, reference is made to the accompanying drawings, which form a part of this specification, and wherein:

FIGS. 1–3 illustrate three types of bearing inserts used in conjunction with the invention;

FIG. 4 shows an elevation in partial section of a cylindrical roller assembly according to the invention; and FIG. 5 shows an elevation in partial section of a conical roller assembly according to the invention.

As shown in the drawings, and particularly in FIGS. 4 and 5, the system of construction components according to the invention can be assembled to construct either a cylindrical or frustoconical roller structure including a roller pipe 1 and conical elements 2, 2′ and 2″ which can be slidably pushed onto roller pipe 1. Bearing inserts of three different types suitable for use with the components to form rollers of the varieties constructible with these basic components are shown in FIGS. 1, 2 and 3, these being identified as elements 10, 20 and 30, respectively. With these elements various types of rollers for roller trains can be constructed, each of these types being simply constructed so that they rotate about a fixed cylindrical shaft 8.

Bearing insert 10 comprises a cylindrical hub portion 11 which, as can be seen in FIG. 4, can be inserted into an end of pipe 1 around shaft 8. The fit between the hub of bearing insert 10 and the interior of pipe 1 is snug and tight so that no additional hardware is necessary to maintain the attachment between these components. The bearing inserts are advantageously formed from plastic and each such bearing insert is provided with ball bearings so that the bearing inserts are mounted rotatably on the shaft 8. Bearing insert 10 is provided with an annular collar 12 which is dimensioned such that the outer diameter of collar 12 is less than the outer diameter of pipe 1 but larger than the interior diameter of pipe 1 so that the shoulder of the collar abuts the end of the pipe.

To form the conical roller 4 of FIG. 5, several conical elements illustrated as 2, 2' and 2'' are slidably pushed, one after the other onto roller pipe 1. Each of these conical elements is pot-shaped in form, having a frustoconical outer surface and opening toward the larger end thereof. Each such conical element except for the smallest one is provided with a collar 13 of smaller diameter than the exterior surface of the smaller end, each of these collars being fitted into the chamfered larger end of the next adjacent smaller conical element. In order to maintain the larger end of the largest such element 2'' in proper fixed coaxial spaced relationship with pipe 1, an annular spacing 33 is provided, spacing piece 33 having an interior bore which surrounds pipe 1, the spacer having a shoulder which abuts the end of the largest frustoconical member.

Bearing inserts 20 and 30 are provided with hub portions 11 which are substantially identical to the hub portion of bearing insert 10 and which can be inserted into an end of pipe 1. They are also provided with ball bearings on the interior openings thereof so that they can similarly be rotatably mounted on shaft 8.

Bearing insert 20 differs from insert 10 in being provided with an additional collar 22 of larger diameter than collar 12, this collar being of a diameter smaller than the outside diameter of the smaller end of the smallest conical element 2. As can be seen in FIG. 5, the bearing insert 20 closes the end of both pipe 1 and also conical element 2 and, by abutting the ends of both of these elements, maintains their relative position.

In cases in which the conical roller 4 of the roller train does not need to be driven, a bearing insert 20 is used at both ends, the larger collar 22 serving to maintain spacer 33 in position at the larger end of the roller. However, when the roller is to be a driven roller, a bearing insert such as insert 30 of FIG. 3 is employed, insert 30 being provided with a collar 32, the diameter of which is chosen to coincide with the larger end of the largest of the frustoconical elements to be employed in constructing the shortest anticipated roller assembly. In the event that more frustoconical elements are employed, indicating that larger elements than that shown as 2'' in FIG. 5 are employed, a larger pulley need not be employed. A larger annular spacer 33 is used, but the shoulder formed by pulley 32 and hub 11 of element 30 bears against the annular spacer and need not be as large as a larger frustoconical element.

Insert 30 is advantageously provided with a rope or belt pulley 35 having two grooves 34 as shown in the embodiment given by way of example in FIG. 3. The pulley is integrally formed on the collar 32 of insert 30 so that a suitable belt or rope drive can be employed to drive the conical roller assembly.

It will be recognized that the diameters of roller pipe 1 and of the smallest conical element 2 are fixed within a specified system of construction units. The lengths of the cylindrical rollers 3 of the roller train and of the conical rollers 4 of the roller train can then be varied arbitrarily. Also, a drive can be provided if desired at any group of rollers in the roller train.

It will be recognized that for all of these variations in possible constructions, only three different bearing inserts are needed, which inserts can be provided as standard mass produced parts. With the help of these interchangeable components, the rollers of the roller train required at any one time can be supplied with a minimum of stocked components, the largest number of these components to be stocked being simple standard parts of minimum complexity and costs.

While certain advantageous embodiments have been chosen to illustrate the invention, it will be understood by those skilled in the art that various changes and modifications can be made therein without departing from the scope of the invention as defined in the appended claims.

What is claimed is:

1. A roller assembly for a roller train comprising
a fixed cylindrical axle;
a roller pipe having cylindrical inner and outer surfaces;
first and second end members each having bearing means therein, said members being slidable onto said axle for rotation thereon, each of said end members having
a hub extending into and frictionally engaging the interior surface of said pipe, and
a flange having a larger outer diameter than said hub, said flange forming a shoulder abutting an end of said pipe;
pulley means integrally formed on said first one of said end members for cooperating with drive means to rotate said roller assembly about said axle;
a plurality of hollow frustoconical members slidable onto said pipe in end-to-end relationship surrounding said pipe and in coaxial relationship therewith, the outer surfaces of said frustoconical members making equal angles with the axes thereof, the smaller end of each said member being of equal diameter with the larger end of the next adjacent one of said members to form a continuous frustoconical outer surface along the length of said roller assembly; and an annular spacer member between the larger end of the largest one of said frustoconical members and said pipe to maintain said larger end in coaxial relationship with said pipe.
said spacer member having means defining a shoulder abutting the larger end of said largest member.

2. A roller assembly according to claim 1 wherein each of said frustoconical members includes
means at the smaller end thereof defining a collar having a central bore substantially equal in inner diameter to the outer diameter of said pipe and an outer surface portion of reduced diameter, said reduced diameter being substantially identical to the inner diameter of the larger end of the next adjacent frustoconical member, whereby said frustoconical members are mating and frictionally engaged with each other and with said pipe.

3. A system of components interchangeably usable to assemble roller assemblies for a roller train on a fixed cylindrical axle, comprising
- a roller pipe having cylindrical inner and outer surfaces;
- first and second end members each having bearing means therein and being slidable onto said axle for rotation theron, each of said end members having
  - a hub slidable into said pipe for frictionally engaging the interior surface thereof, and
  - a flange having a larger outer diameter than said hub, said flange forming a shoulder abutting an end of said pipe;
- pulley means integrally formed on said first one of said end members for cooperating with drive means to rotate said roller assembly about said axle;
- a plurality of hollow frustoconical members slidable onto said pipe in end-to-end relationship surrounding said pipe and in coaxial relationship therewith, the outer surfaces of said frustoconical members making equal angles with the axes thereof, the smaller end of each said member being of equal diameter with the larger end of the next adjacent one of said members to form a continuous frustoconical outer surface along the length of said roller assembly; and
- an annular spacer member between the larger end of the largest one of said frustoconical members and said pipe to maintain said larger end in coaxial relationship with said pipe,
  - said spacer member having means defining a shoulder abutting the larger end of said largest member.

* * * * *